United States Patent
Borghetti et al.

(10) Patent No.: US 9,066,846 B2
(45) Date of Patent: Jun. 30, 2015

(54) CONTROL COLUMN FOR TURKISH BATH

(75) Inventors: Marco Borghetti, Cesena (IT); Luigi Mandolini, Recanati (IT)

(73) Assignee: MAC S.r.l. (IT)

( * ) Notice: Subject to any disclaimer, the term of this patent is extended or adjusted under 35 U.S.C. 154(b) by 292 days.

(21) Appl. No.: 13/642,105

(22) PCT Filed: Apr. 19, 2011

(86) PCT No.: PCT/IB2011/000858
§ 371 (c)(1),
(2), (4) Date: Dec. 31, 2012

(87) PCT Pub. No.: WO2011/132059
PCT Pub. Date: Oct. 27, 2011

(65) Prior Publication Data
US 2013/0133133 A1    May 30, 2013

(30) Foreign Application Priority Data
Apr. 19, 2010  (IT) .............................. BO20100041 U

(51) Int. Cl.
*A61H 33/06* (2006.01)
*A47J 27/17* (2006.01)
*A61H 33/00* (2006.01)
*B01F 15/02* (2006.01)

(52) U.S. Cl.
CPC ................. *A61H 33/06* (2013.01); *A47J 27/17* (2013.01); *A61H 33/005* (2013.01); *A61H 33/065* (2013.01); *A61H 2201/5046* (2013.01); *B01F 15/0288* (2013.01)

(58) Field of Classification Search
CPC ................... A61H 33/065; A61H 2201/5046; A61H 2033/068; A47K 3/28
USPC ............................................................ 4/524
See application file for complete search history.

(56) References Cited

U.S. PATENT DOCUMENTS 6,631,525 B2 * 10/2003 Piatt et al. .......................... 4/619
2007/0220668 A1 * 9/2007 Talocci et al. ..................... 4/524

FOREIGN PATENT DOCUMENTS

WO    WO 2009125285 A1 * 10/2009

* cited by examiner

*Primary Examiner* — Huyen Le
*Assistant Examiner* — Nicholas Ros
(74) *Attorney, Agent, or Firm* — Matthew A. Pequignot; Pequignot + Myers LLC

(57) ABSTRACT

A control column for Turkish bath internally houses a steam generator and a touch-screen control panel that can be activated by the user through contact with a front wall of the control column, has a housing for a collection container, and is provided with a hydraulic circuit that is connected to the mains water supply and extends through the control column to supply water into said collection container.

11 Claims, 2 Drawing Sheets

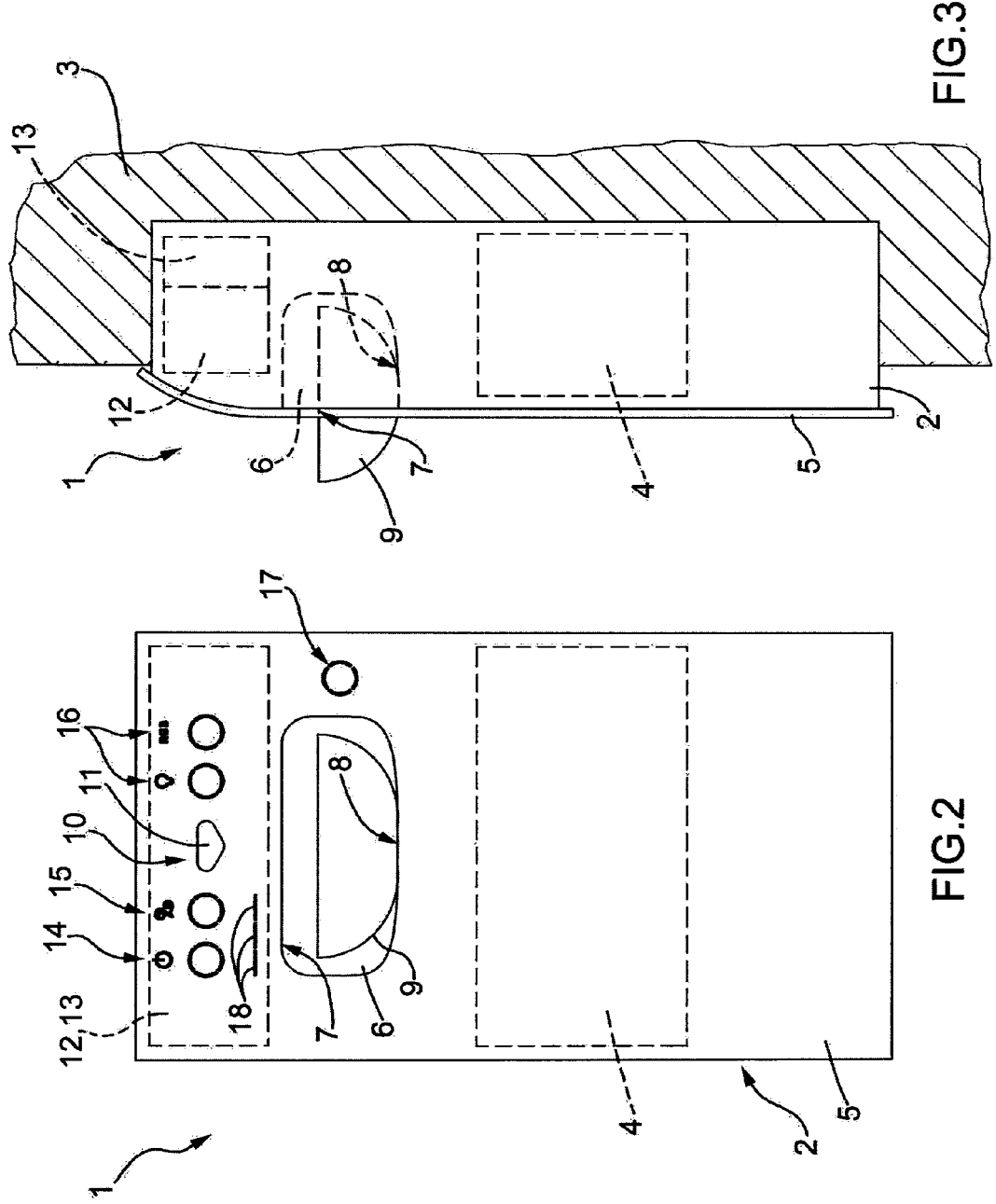

CONTROL COLUMN FOR TURKISH BATH

RELATED APPLICATION DATA

This application is the national stage entry of International Appl. No. PCT/IB2011/000858, filed Apr. 19, 2011, which claims priority to Italian Patent Application No. B02010U000041, filed on Apr. 19, 2010. All claims of priority to these applications are hereby made, and each of these applications is hereby incorporated in its entirety by reference.

TECHNICAL FIELD

The present invention refers to a control column for Turkish bath.

In particular, the present invention refers to a control column for Turkish bath of the type comprising a box-shaped containment body delimited by a front wall accessible by a user; a steam generator housed inside the box-shaped body; and a touch-screen control panel housed inside said box-shaped body and which can be activated by user contact with said front wall in order to control at least operation of the steam generator.

BACKGROUND ART

Generally, the control column is associated with a shower or tap fitted inside the Turkish bath so that the user can cool himself down and/or to wash the seating inside the Turkish bath.

Installing two separate and independent devices, i.e. the control column and the shower or tap, makes fitting out the Turkish bath a relatively long, complex and expensive process and tends to mean the Turkish bath has relatively large overall dimensions.

DISCLOSURE OF INVENTION

It is an object of the present invention to provide a control column for Turkish bath that is simple and economical to produce without the aforementioned drawbacks.

According to the present invention, there is provided a control column for Turkish bath as set forth in the appended claims.

BRIEF DESCRIPTION OF THE DRAWINGS

The present invention will now be described with reference to the accompanying drawings which illustrate a non-limiting embodiment thereof, in which:

FIG. 2 is a schematic front view of the control column of FIG. 1; and

FIG. 3 is a schematic side view of the control column of FIG. 1.

BEST MODE FOR CARRYING OUT THE INVENTION

Figure 1:
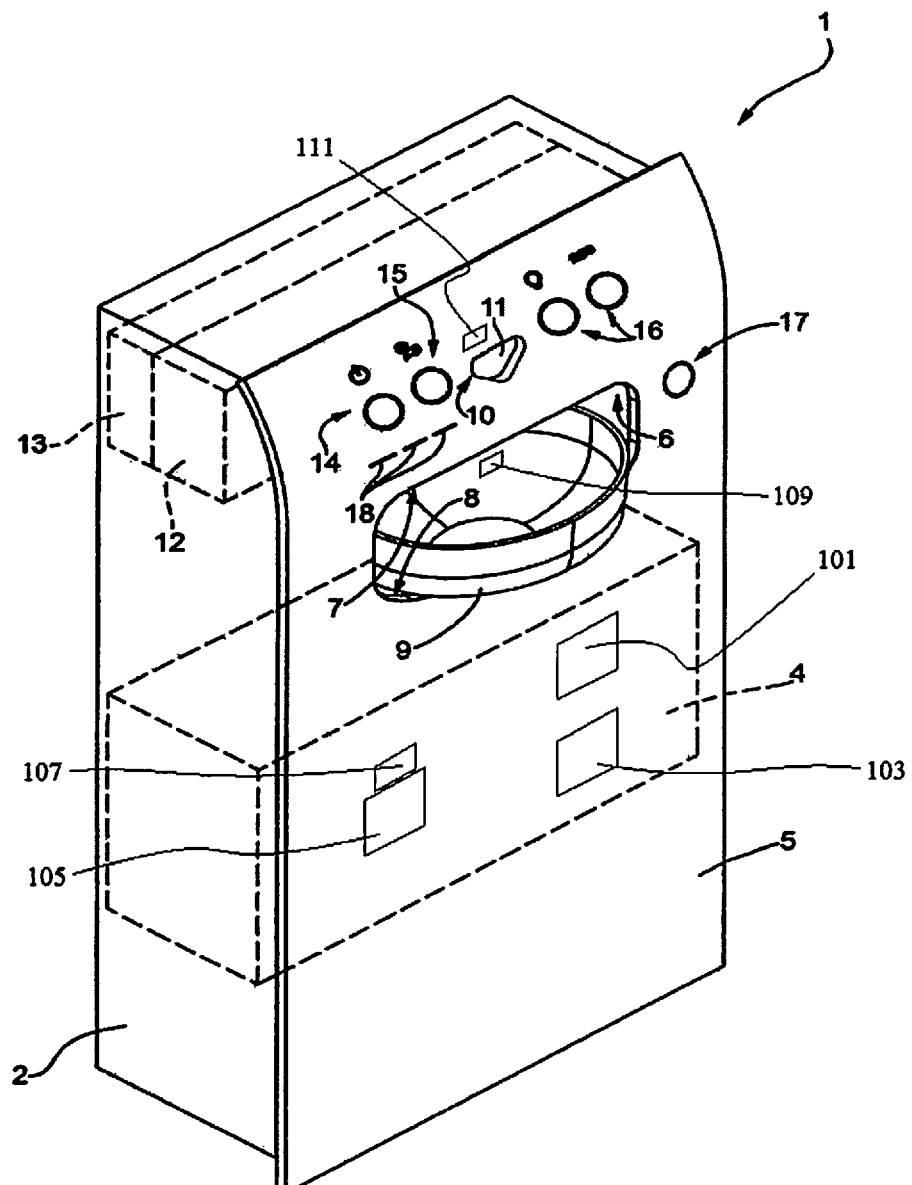
FIG. 1 is a schematic perspective view of a preferred embodiment of the control column for Turkish bath according to the present invention.

In FIGS. 1, 2, and 3, designated as a whole by number 1 is a control column for Turkish bath comprising a box-shaped containment body 2 that is substantially parallelepiped in shape, which is fitted inside a masonry structure 3 of a Turkish bath.

The box-shaped body 2 houses a steam generator 4, fastened to the box-shaped body 2, which has an inlet 101 through which the water flows into the generator 4 and an outlet 103 through which the water flows out of the generator 4, and is provided with a diffuser 105 of the steam in the Turkish bath.

The box-shaped body 2 also supports a lighting device 107 oriented in such a way as to illuminate the steam supplied outside the control column 1 through said diffuser 105, is closed to the front by a shaped glass panel 5, and has a housing 6, which is obtained in the box-shaped body 2, opens towards the outside through a slot 7 obtained through the panel 5, and is delimited by a substantially horizontal bottom wall 8 defining a supporting surface for a collection container 9 shaped and scaled in such a way as to protrude outside the box-shaped body 2 through the slot 7.

The panel 5 may be made in a single piece or several pieces.

The control column 1 is also equipped with a hydraulic circuit 10 connected to the mains water supply and which extends through the box-shaped body 2, and opens towards the outside in correspondence with an outlet 11 obtained through the panel 5 above the slot 7 in such a way that the water falls inside the container 9.

The control column 1 also comprises a touch-screen type control panel 12 that is mounted inside the box-shaped body 2, is connected to an electronic power supply card 13 and comprises a light button 14 for switching on the control column 1; a light button 15 for switching on the generator 4; a pair of light buttons 16 for switching on a LED type ceiling light (not shown) outside the control column 1; a light button 17 for switching on the hydraulic circuit 10; and a plurality of light buttons 18 for selectively controlling the temperature inside the Turkish bath.

Buttons 14-18 are activated and de-activated selectively by means of the variation in electric capacity detected following contact between the user's finger and the panel 5, and have at least two levels of brightness, that is to say, relatively reduced brightness when the buttons 14-18 are de-activated and relatively high brightness when the buttons 14-18 are activated. With regard thereto, it should be noted that the button 14 is always illuminated and is activated by the user to switch on/off the buttons 15-18.

The control panel 12 and the glass panel 5 permit activation of the buttons 14-18 in the damp, wet environment of the Turkish bath in impermeable, insulated conditions.

Activation of the button 17 permits filling of the container 9 which the user can remove from the housing 6 to cool himself down and/or to wash the seating of the Turkish bath.

According to an alternative embodiment that is not shown, the outlet 11 is eliminated and the hydraulic circuit 10 is provided with an outlet arranged inside the box-shaped body 2 and above the container 9.

According to a further alternative embodiment, the control column 1 is also provided with a lighting device to illuminate the container 9 (lighting device 109) and the outlet 11 (lighting device 111).

The invention claimed is:

1. Control column for Turkish bath comprising a box-shaped containment body (2) delimited by a front wall (5) accessible by a user; a steam generator (4) housed inside the box-shaped body (2); and a touch-screen control panel (12) housed inside the box-shaped body (2) and activated by the user through contact with the front wall (5) in order to control at least operation of the steam generator (4); and characterised in that it also comprises a housing (6) obtained in the box-shaped body (2), and which opens towards the outside through the front wall (5); a collection container (9) that can be inserted in the housing (6); and a hydraulic circuit (10) which is connected to the mains water supply, and extends through the box-shaped body (2) in order to feed water into the collection container (9).

2. Control column according to claim 1, wherein the housing (6) communicates with the outside via a slot (7) obtained through the front wall (5); the hydraulic circuit (10) being provided with an outlet (11) obtained through the front wall (5) above the slot (7).

3. Control column according to claim 1, wherein the front wall (5) is made of glass.

4. Control column according to claim 1, wherein the hydraulic circuit (10) is provided with an outlet (11) obtained through the front wall (5) above a slot (7); and one or more lighting devices being provided to illuminate the collection container (9) and the outlet (11).

5. Control column according to claim 1 and also comprising an inlet through which the water flows into the steam generator (4), an outlet through which the water flows out of the steam generator (4), a diffuser of the steam outside the control column, and a first lighting device to illuminate the steam supplied through said diffuser.

6. Control column according to claim 5, wherein the control panel (12) comprises at least a first light button (15) for switching on the steam generator (4).

7. Control column according to claim 6, wherein the control panel (12) also comprises at least a second light button (16) for switching on a second lighting device connected to said control column.

8. Control column according to claim 7, wherein the control panel (12) also comprises at least one selection light button (18) for selecting the temperature in the Turkish bath.

9. Control column according to claim 8, wherein the control panel (12) also comprises a third light button (17) for switching on the hydraulic circuit (10).

10. Control column according to claim 9, wherein the control panel (12) also comprises a fourth light button (14) that can be activated by the user to switch on and off at least one light button selected from the group consisting of: said first light button (15); said second light button (16); said third light button (17); and said at least one selection light button (18).

11. Control column according to claim 10, wherein at least one light button selected from the group consisting of: said first light button (15); said second light button (16); said third light button (17); said fourth light button (14); and said at least one selection light button (18) is characterised by at least two different levels of brightness.

\* \* \* \* \*